(12) United States Patent
Hock

(10) Patent No.: US 6,213,501 B1
(45) Date of Patent: Apr. 10, 2001

(54) METHOD OF IMPROVING BALLISTICS BY IGNITION SYSTEM PORTING IN AN AIRBAG INFLATOR

(75) Inventor: Christopher Hock, Uintah, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/044,450

(22) Filed: Mar. 19, 1998

(51) Int. Cl.[7] .................................................. B60R 21/26
(52) U.S. Cl. .................................... 280/736; 280/742
(58) Field of Search ................................. 280/736, 740, 280/741, 742; 102/530, 531, 202.14

(56) References Cited

U.S. PATENT DOCUMENTS

| | | |
|---|---|---|
| 4,272,102 | 6/1981 | Burkdoll . |
| 4,414,902 * | 11/1983 | Strasser et al. ................. 102/531 |
| 4,561,675 * | 12/1985 | Adams et al. ................. 280/734 |
| 4,817,828 | 4/1989 | Goetz . |
| 4,846,368 | 7/1989 | Goetz . |
| 4,928,991 | 5/1990 | Thorn . |
| 5,058,921 | 10/1991 | Cuevas . |
| 5,100,171 | 3/1992 | Faigle . |
| 5,222,761 | 6/1993 | Kaji . |
| 5,280,946 | 1/1994 | Adams . |
| 5,372,380 | 12/1994 | Duffy . |
| 5,458,364 | 10/1995 | Mueller . |
| 5,458,371 * | 10/1995 | Fulmer et al. ................. 280/741 |
| 5,483,896 | 1/1996 | Hock . |
| 5,492,361 | 2/1996 | Kim . |
| 5,505,488 | 4/1996 | Allard . |
| 5,518,268 | 5/1996 | Moore . |
| 5,520,411 | 5/1996 | Lang . |
| 5,533,751 | 7/1996 | Kort . |
| 5,542,702 | 8/1996 | Green . |
| 5,564,736 | 10/1996 | Kim . |
| 5,564,741 * | 10/1996 | Ward et al. ................. 280/740 |
| 5,623,115 | 4/1997 | Lauritzen . |
| 5,668,345 | 9/1997 | Schroeder . |
| 5,669,631 | 9/1997 | Johnson . |
| 5,681,055 | 10/1997 | Green . |
| 5,692,768 | 12/1997 | Mihm . |
| 5,716,072 * | 2/1998 | O'Driscoll ................. 280/740 |
| 5,788,274 * | 8/1998 | Gunn ................. 280/736 |
| 5,806,885 * | 9/1998 | Hock ................. 280/737 |

* cited by examiner

Primary Examiner—Paul N. Dickson
(74) Attorney, Agent, or Firm—Sally J. Brown

(57) ABSTRACT

An improved ignition system for vehicle airbags is described. This invention includes a novel means for venting igniter material gases in such a manner as to more evenly distribute the flow in a more disperse manner, thereby permitting the gas generant to burn more uniformly throughout the generant bed. This invention by venting igniter gases more efficiently produces improved airbag ballistics, namely lowered average airbag deployment delay and increased consistency of operation.

19 Claims, 5 Drawing Sheets

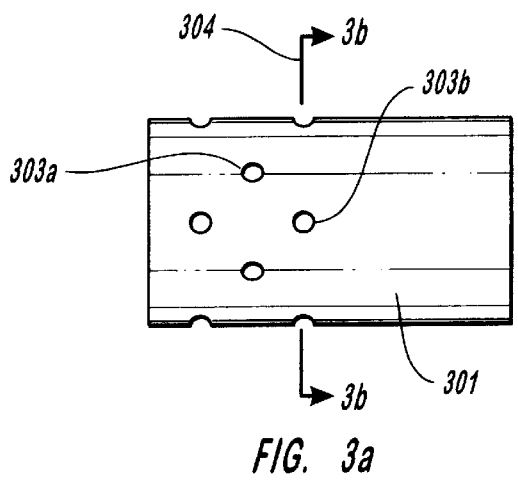
FIG. 3a
FIG. 3b
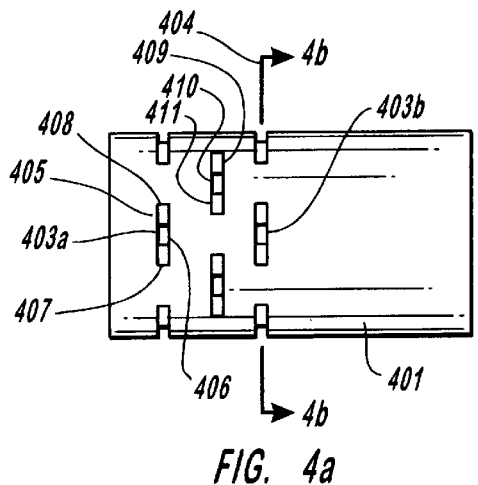
FIG. 4a
FIG. 4b
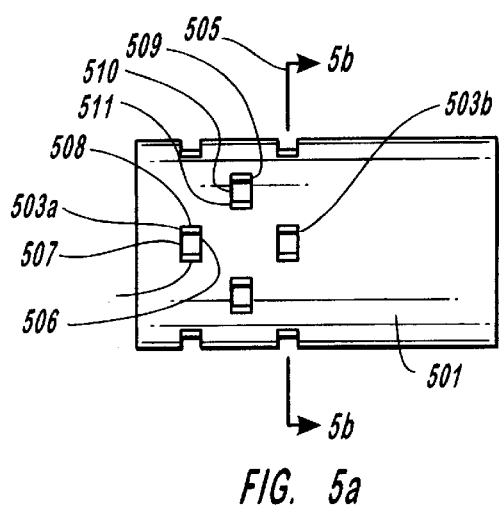
FIG. 5a
FIG. 5b

|  | Delay (msec) | $P_{p0}$ (kPa) | $P_{a0}$ (kPa) |
|---|---|---|---|
| Cylindrical | 5.0 | 48 | 132 |
| Cylindrical | 6.4 | 63 | 136 |
| Cylindrical | 5.0 | 59 | 141 |
| Cylindrical | 5.6 | 50 | 139 |
| Average | 5.8 | 55 | 137 |
| St. Dev | 0.6 | 8 | 4 |
| Slotted Holes | 2.6 | 59 | 140 |
| Slotted Holes | 4.4 | 51 | 141 |
| Slotted Holes | 4.4 | 59 | 138 |
| Slotted Holes | 3.4 | 53 | 137 |
| Slotted Holes | 3.9 | 60 | 143 |
| Average | 3.7 | 58 | 140 |
| St. Dev | 0.8 | 3 | 2 |

FIG. 7

METHOD OF IMPROVING BALLISTICS BY IGNITION SYSTEM PORTING IN AN AIRBAG INFLATOR

BACKGROUND OF THE INVENTION

1. Field of the Invention

This invention relates to automobile airbags inflators. More specifically, this invention relates to the control of the ignition train of the gas generant used in airbag inflators.

2. Description of Related Art

The safety of automobile passengers has taken important steps forward with the development of automobile airbags. Airbags are inflatable automobile safety devices that help protect a driver or front-seat passenger in a collision. Airbags are most effective when the collision is a head-on or front-angle collision and when they are used in combination with lap and shoulder belts. The typical airbag system consists of a cloth airbag, an inflator, a cover, a can or module to hold the various components, and sensors for detecting the sudden deceleration of the automobile. A computerized control unit typically monitors the system for malfunctions. The sensors, generally mounted on the front of the vehicle and in the passenger compartment, operate on power from the automobile's battery or from the computerized control unit. Typically, airbags are designed to inflate when the automobile strikes an immovable object at more than about ten miles per hour or another automobile at about twice that speed. After an impact, sensors send an electric current to an igniter system or, in some cases to the computerized control unit. This unit evaluates the situation and then sends an electrical impulse to the igniter system. Typically, electrical impulse produces a current which in turn heats a filament, which ignites a pyrotechnic material contained within a capsule. The ignition capsule supplies heat at pressure to ignite gas generating pellets. In most systems, the pellets are made of sodium azide and produce nitrogen gas when they burn. In some systems, pressurized argon gas is used instead. The gas expands quickly and inflates the airbag, which then breaks through a plastic cover in the steering wheel or, on the passenger side, in the dashboard of the automobile. Typically, the whole process takes about 0.1 second from the moment a crash is detected. Once deployed an airbag starts to deflate immediately, venting the harmless gas through openings in the bag or through the bag fabric itself.

A variety of igniter chambers, cavity, and ignition ports have been developed and are widely used in automobile airbags. Traditionally igniter tubes have used cylindrically shaped orifices to control the flow of the ignition material. However, such cylindrically shaped orifices have contributed to relatively poor ignition because of the lack of uniform dispersal of ignition material through the combustion chamber. Because ignition efficiency is directly related to the uniformity of the dispersal of the ignition material or gas generant, through the combustion chamber, improved orifices which provide greater uniformity of gas dispersal, resulting in reduced ignition delay and enhanced performance repeatability of ignition.

For general background material, the reader is directed to U.S. Pat. Nos. 4,272,102, 4,817,828, 4,846,368, 4,928,991, 5,058,921, 5,100,171, 5,222,761, 5,280,946, 5,372,380, 5,458,364, 5,483,896, 5,492,361, 5,505,488, 5,518,268, 5,520,411, 5,533,751, 5,542,702, 5,564,736, 5,623,115, 5,668,345, 5,669,631, 5,681,055, and 5,692,768, each of which is hereby incorporated by reference in its entirety for the material disclosed therein.

SUMMARY OF THE INVENTION

It is desirable to provide a method of improving the ballistics of the ignition system in airbag inflators. Since the ballistic characteristics of airbag ignition systems are directly related to the system inflation delay and operation consistency, improving the flow of the igniter material through the igniter tube to the combustion chamber which provide improvements in the uniformity of the dispersal of the igniter material enhances the operation and performance of vehicle airbags. Improved performance of airbags enhance the safety of automobiles for both drivers and passengers. Therefore, providing improved automobile airbag ignition system ballistics is important in the effort to continue to enhance the safety of automobile travel.

Accordingly, it is the general objective of this invention to provide ignition ports of the igniter chamber which are configured in such a manner as to distribute the flow of igniter material in a more disperse manner.

It is a further objective of this invention to provide improved uniformity of igniter material through the combustion chamber.

It is a further objective of this invention to provide improved ballistics of ignition in airbag igniter.

It is a still further objective of this invention to provide igniter tubes having an improved orifice design which provides improved ignition material flow.

It is another objective of this invention to provide igniter tubes have a slotted orifice structure to improve the repeatability of ignition.

Another objective of this invention is to provide igniter tubes having orifices which provide reduced ignition delay.

Another objective of this invention is to provide igniter tubes which provide improved pressure rise consistency within the combustion chamber.

These and other objectives of this invention will be readily understood by those of ordinary skill in the art upon consideration of the following detailed description, preferred embodiment, drawings and claims of the present invention.

BRIEF DESCRIPTION OF THE DRAWINGS

FIG. 3a shows the side view of the traditional prior art cylindrically orificed igniter tube.

FIG. 3b shows the end view of the traditional prior art cylindrically orificed igniter tube.

FIG. 4a shows the side view of a first preferred embodiment of the invention using an igniter tube with slotted orifices.

FIG. 4b shows a section view of the first preferred embodiment of the invention using an igniter tube with slotted orifices.

FIG. 5a shows the side view of a second preferred embodiment of the invention using an igniter tube with slotted orifices.

FIG. 5b shows a section view of a second preferred embodiment of the invention using an igniter tube with slotted orifices.

FIG. 7 shows a table of measured performance values, comparing the performance of cylindrical orifices and that of the slotted orifices of this invention.

DETAILED DESCRIPTION OF THE INVENTION

This invention is an igniter chamber, for use in automobile airbag systems, which is designed to distribute the gas flow from the igniter material in a more disperse manner, thereby permitting the ignition of the gas generant to proceed more uniformly throughout the generant bed, thereby producing improved airbag ballistics. The traditional igniter tubes in use have cylindrical orifices. The preferred igniter tube of this invention has slotted orifices which when employed in the airbag system have been shown to provide lower ignition delay with faster and more consistent increase in pressure in the combustion chamber. This results in more repeatable performance in the cylindrical orificed igniter tube design, as well as lower ignition delay and more consistent (lower standard deviation) performance.

Figure 1:
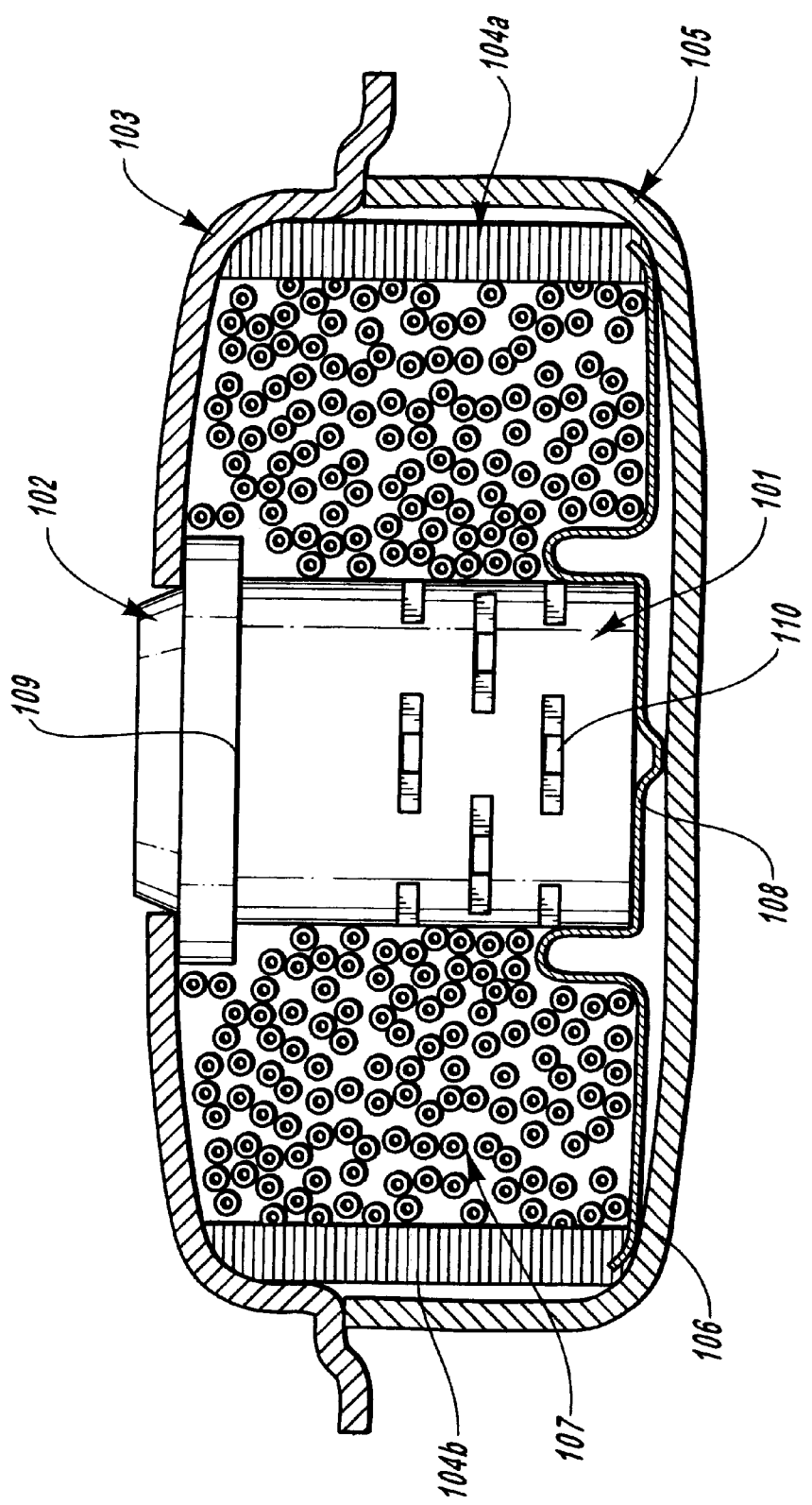
FIG. 1 shows a partial cross section of an inflator containing the ignition system of this invention.

Referring now to the Figures and particularly to FIG. 1, which shows a partial cross section of an automobile airbag inflator containing the ignition system of this invention. The several key components of a preferred airbag inflator assembly are shown in relative position to each other. A preferred embodiment of the igniter tube 101, with one preferred embodiment of the igniter slots 110 of the invention, is press fit in place onto a squib adapter 102 mounted on its first end 109. The airbag inflator base 103 is shown with the squib adapter 102 welded in place. Adjacent to the generant retainer and welded to the base 103 is a diffuser 105. Within the airbag igniter is provided a screen pack 104, as well as the gas generant pellets 107. The gas generant pellets 107 are confined within the screen pack 104 by the retainer 106.

Figure 2:
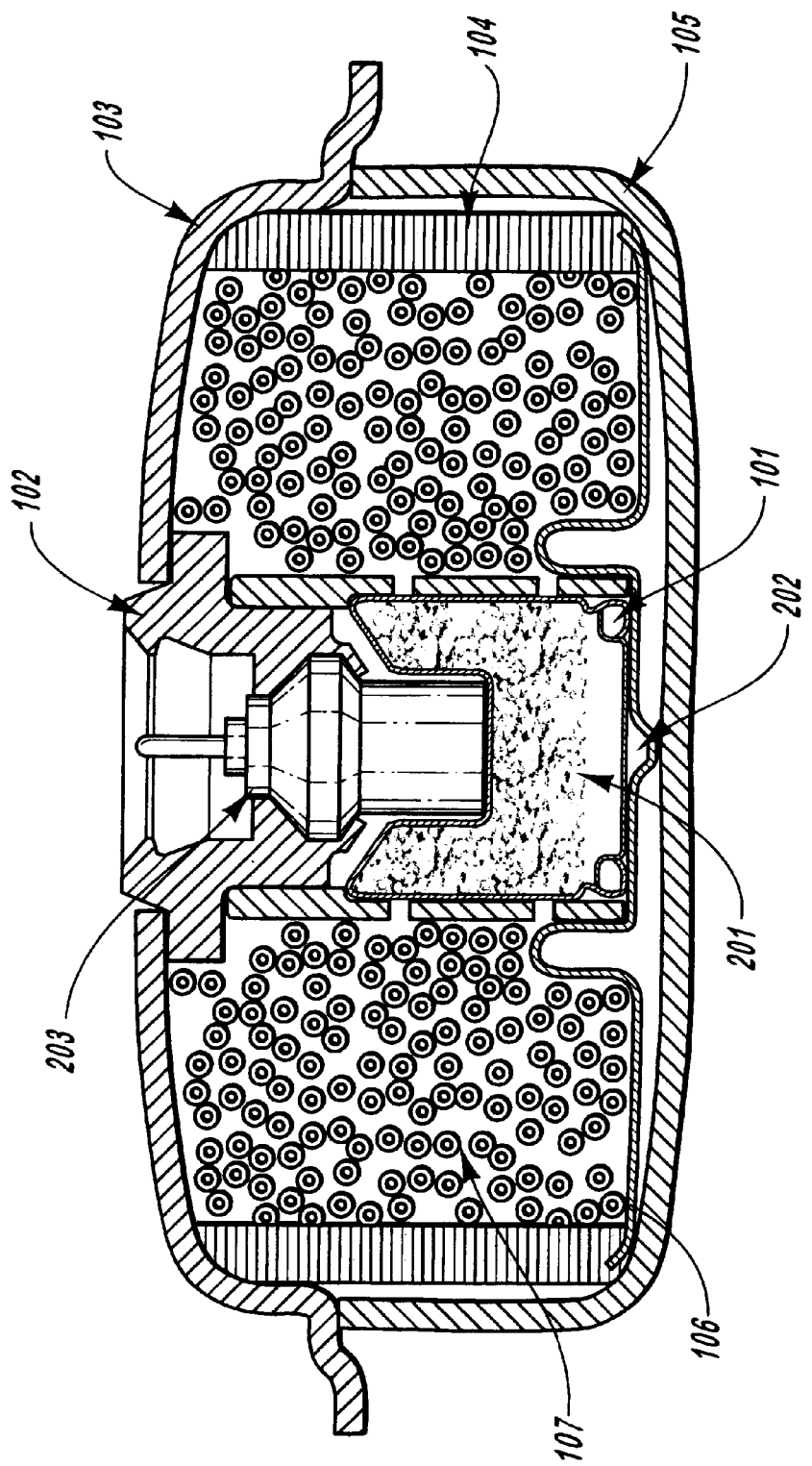
FIG. 2 shows a full cross section of an inflator providing additional detail of the igniter components of the invention.

FIG. 2 depicts a full cross section of an inflator providing additional detail of the igniter components and is useful for providing an overview of the use of the operation of the igniter. Once an impact is detected by sensors (not shown), an electric current is sent through conductors to the squib 203, which is held in place by the squib adapter 102. A filament within the squib 203 is heated by the applied electric current. Upon reaching a desired temperature, the filament within the squib 203 ignites a pyrotechnic contained within it 203. The pyrotechnic burns, producing both gas and heat, which in turn ignites the igniter material 201. The igniter material 201 ignites and produces gas and heat, quickly bursting the igniter cup 202 that normally holds the igniter material 201. The gas produced by the burning igniter material 201 then passes through the slots 110 in the igniter tube 101 thereby entering and igniting the gas generant pellets 107. The gas generant pellets 107 burn producing gas, heat and solid particulate matter. Gas produced from the burning of the gas generant pellets 107 passes through the screen pack 104 where it is cooled and filtered to remove the solid particulate matter. The resulting cooled and filtered gas then passes through the diffuser 105 to the airbag, which is thereby inflated. FIG. 3a shows the side view of the traditional prior art cylindrically orificed igniter tube 301. The cylindrical orifices 303 are shown in their typical configuration. FIG. 3b shows a section view 302 of the traditional cylindrically orificed igniter tube 301 along a section plane 304. As can be seen the traditional igniter tube 301 has a plurality of orifices 303 which are generally cylindrical in shape. Such traditional tubes 301 require that the gas generated by the ignition of the igniter material 201 pass through the generally constant and confined cylindrical orifices 303, thereby causing undesirable gas generant ignition delay and variability of performance.

FIG. 4a shows the side view of a first preferred embodiment of the invention using an igniter tube 101 with slotted orifices 403. The slotted orifices 403 of this embodiment are adapted such that each slot 403 appears to be generally rectangular in shape, having two sides 405, 406 that are substantially of greater dimension than the other two sides 407, 408. Each slot 403 is presented with three portions 409, 410, 411. The portions 409, 411 are portions which designate the expansion of the slot 403 as it extends from portion 410 which is the opening into the interior 412 of the igniter tube 101. The reader will observe that portion 410 has generally the same relative dimensions as portions 409, 411. This embodiment permits the expansion of the gas as it exits the ignition tube of approximately three to one. The increase in slot dimension permits the gas to diffuse throughout the generant bed, efficiently expanding in a relatively wide arc within the generant bed with less delay, which leads to an improvement in combustion chamber pressure. FIG. 4b further shows the end section view of the first preferred embodiment of the invention, having slotted orifices 403 in the igniter tube 101 being cut along the plane 404, further demonstrating the increase in slot dimension between the inner opening 413 and the outer opening 414 of this preferred slot 403.

FIG. 5a shows the side view of a second preferred embodiment of the invention using an igniter tube 101 with slotted orifices 503. The slotted orifices 503 of this embodiment are adapted such that each slot 503 appears to be generally rectangular in shape, having two sides 505, 506 that are only somewhat of greater dimension than the other two sides 507, 508. Each slot 503 is presented with three portions 509, 510, 511. The portions 509, 511 are portions which designate the expansion of the slot 503 as it extends from portion 510 which is the opening into the interior 512 of the igniter tube 101. The reader will observe that in this embodiment of the invention portion 510, the opening into the interior 512 of the igniter tube 101, is generally significantly larger than the cut-away portions 509, 511. This embodiment permits the expansion of the gas as it exits the ignition tube of approximately 1.5 to 1. Such an increase in slot dimension permits the gas to diffuse throughout the generant bed, efficiently expanding in a relatively wide arc within the generant bed with less delay than the traditional cylindrical orifice, but somewhat more delay than the first preferred embodiment of the invention. This embodiment also leads to an improvement in combustion chamber pressure and demonstrates the tune ability of the invention. By adapting the various dimensions of the slots the ignition tube 101 itself can be tuned to various igniter delays, while maintaining a degree of consistency in tubes having the same types of slots, not found in the traditional cylindrical orifices. FIG. 5b further shows the end section view of the first preferred embodiment of the invention, having slotted orifices 503 in the igniter tube 101 being cut along the plane 504, further demonstrating the increase in slot dimension between the inner opening 513 and the outer opening 514 of this preferred slot 503.

Figure 6A:
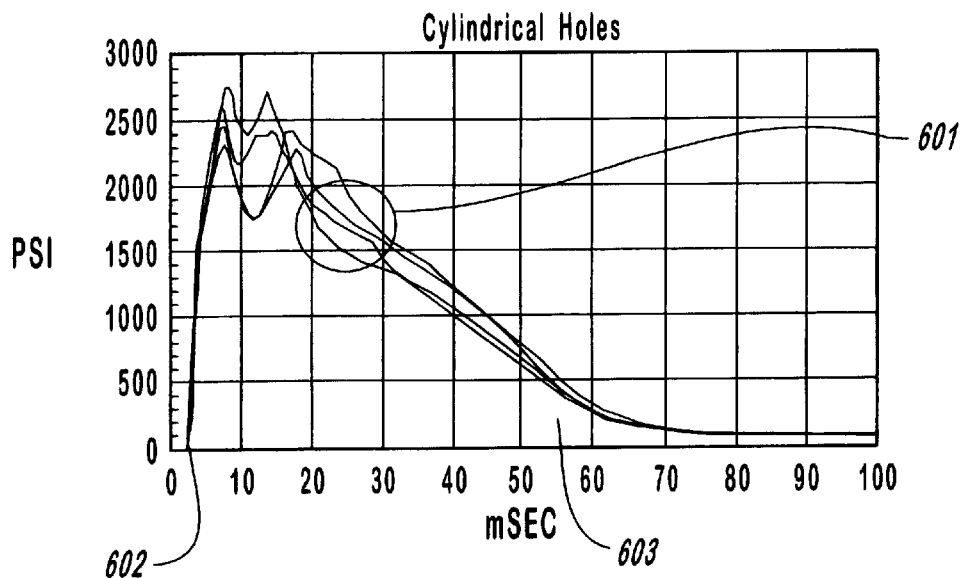
FIG. 6a shows an experimentally measured pressure verses time chart for an igniter tube having traditional cylindrical orifices.

FIG. 6a shows an experimentally measured combustion pressure verses time chart for an igniter tube design having traditional cylindrical orifices. This figure shows the wide variation in performance 601 between various identical cylindrical orificed ignition tubes, as well as the typical time from point of ignition 602 of the igniter material 201 until the combustion pressure has dropped to ambient levels 603.

Figure 6B:
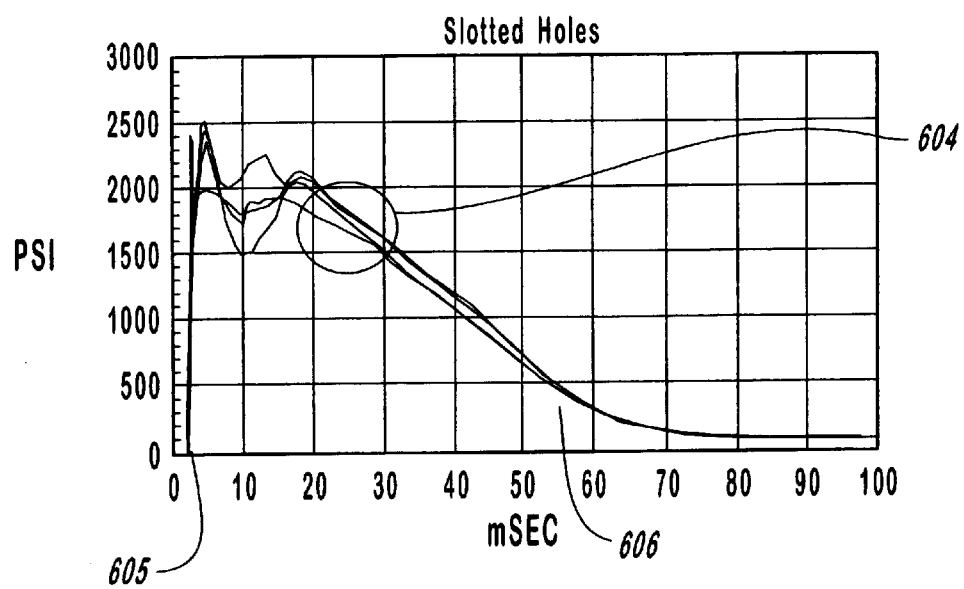
FIG. 6b shows an experimentally measured pressure verses time chart for an igniter tube having the slotted orifices of this invention.

FIG. 6*b* shows an experimentally measured combustion pressure verses time chart for an igniter tube design having new slotted orifices. This figure shows the narrow variation in performance 604 between various identical slotted orificed ignition tubes, as well as the typical time from the point of ignition 605 of the igniter material 201 until the combustion pressure has dropped to ambient levels 606.

FIG. 7 shows a table of measured performance values, comparing the performance of cylindrical orifices and that of the slotted orifices of this invention. As this chart demonstrates, the use of slotted orifices in ignition tubes result in performances which have lower average ignition delay (3.7 milliseconds verses 5.8 milliseconds), higher average tank pressure (58 kPa at 20 milliseconds and 140 kPa at 40 milliseconds verses 55 kPa at 20 milliseconds and 137 kPa at 40 milliseconds), and increased tank pressure consistency (standard deviations of 3 kPa and 2 kPa respectively verses 8 kPa and 4 kPa), than otherwise identical cylindrical orifices. Since, in the operation of vehicle airbags two of the most important constraints on total airbag system performance are ignition delay and repeatability, it can be seen that this invention provides an important improvement in the performance of vehicle airbag systems.

It should be understood that the above described embodiments of this invention are merely illustrative of numerous and varied other embodiments which may constitute applications of the principles of the invention. For example, the relative dimensions of the lengths of the sides of individual slots may be easily varied. The relative sizes of each portion of the slots could also be varied. Even the generally rectangular shape of the invention may be altered without departing from the intended scope of this invention. These and other embodiments of this invention may be readily devised by those skilled in the art without departing from the spirit or scope of this invention and it is the inventor's intent that they are deemed to be within the scope of this invention. Therefore, the scope of this invention is indicated by the range and equivalency of the appended claims.

I claim:

1. A method of improving ballistics by ignition system porting in an airbag inflator, comprising:
   (A) igniting a pyrotechnic material contained within a squib;
   (B) burning said pyrotechnic material contained within said squib;
   (C) producing gas and heat from said pyrotechnic material to ignite an igniter material;
   (D) igniting said igniter material;
   (E) producing gas and heat from said igniter material; and
   (F) venting said gas through a slot in an igniter tube to a gas generant, said slot having an inner opening and an outer opening, said inner opening having a smaller dimension than said outer opening.

2. A method of improving ballistics by ignition system porting in an airbag inflator, as recited in claim 1, wherein said step of venting said gas through a slot in an igniter tube to a gas generant further comprises provding a plurality of 'slots in said igniter tube.

3. An airbag inflator system, comprising:
   (A) an igniter tube, having an interior, an exterior and a slot for venting gas, said slot having an inner opening and an outer opening said inner opening having a smaller dimension than said outer opening;
   (B) igniter material held in said interior of said igniter tube;
   (C) a squib attached within said interior of said igniter tube;
   (D) gas generant placed around said exterior of said igniter tube;
   (E) a base attached to said squib; and
   (F) a diffuser attached to said base.

4. An airbag inflator system, as recited in claim 3, wherein said igniter tube further comprises a plurality of slots for ventilation.

5. An airbag inflator system, as recited in claim 3, wherein said igniter tube slot further comprises an opening extending from said interior of said igniter tube to said exterior of said igniter tube.

6. An airbag inflator system, as rectied in claim 3, wherein said igniter tube slot further comprises a length and a height, wherein said length is greater than said height.

7. An airbag inflator system, as recited in claim 3, wherein said igniter tube slot has a generally rectangular shape.

8. An airbag inflator system, as recited in claim 3, wherein said igniter tube slot further comprises a plurality of portions.

9. An airbag inflator system, as recited in claim 8, wherein said portions include a portion defining an opening from said interior of said igniter tube to said exterior of said igniter tube.

10. An airbag inflator system, as recited in claim 8, wherein said portions include a first generally sloped surface extending from said exterior of said igniter tube to said interior of said igniter tube.

11. An airbag inflator system, as recited in claim 8, wherein said portions include a second generally sloped surface extending from said exterior of said igniter tube to said interior of said igniter tube.

12. An improved airbag ignition tube, comprising:
   (A) an interior adapted for holding igniter materials;
   (B) an exterior adapted for fitting within a region containing gas generant; and
   (C) a slot for communicating gas from said interior to said exterior, said slot having an inner opening and an outer opening, said inner opening having a smaller dimension than said outer opening.

13. An improved airbag ignition tube, as recited in claim 12, further comprising a fitting for receiving a squib for igniting said igniter materials.

14. An improved airbag ignition tube, as recited in claim 12, further comprising a plurality of slots for communicating gas from said interior to said exterior.

15. An improved airbag ignition tube, as recited in claim 12, wherein said slot further comprises a first portion providing an opening between said interior of said ignition tube and said exterior of said ignition tube.

16. An improved airbag ignition tube, as recited in claim 12, wherein said slot further comprises a second portion having a first generally sloped surface extending from said exterior of said igniter tube to said interior of said igniter tube.

17. An improved airbag ignition tube, as recited in claim 12, wherein said slot further comprises a third portion having a first generally sloped surface extending from said exterior of said igniter tube to said interior of said igniter tube.

18. An improved airbag ignition tube, as recited in claim 12, wherein said slot has a generally rectangular shape.

19. An improved airbag ignition tube, as recited in claim 12, wherein said slot has a height and a width and wherein said width is greater than said height.

* * * * *